United States Patent

[11] 3,556,549

| [72] | Inventors | Gordon L. Hershman<br>La Grange;<br>Gerald N. Borchardt, Claredon Hills, Ill. |
|---|---|---|
| [21] | Appl. No. | 754,061 |
| [22] | Filed | Aug. 20, 1968 |
| [45] | Patented | Jan. 19, 1971 |
| [73] | Assignee | International Harvester Company<br>Chicago, Ill.<br>a corporation of Delaware |

[54] STEERING WHEEL PIVOTING MECHANISM FOR RIDING MOWER
5 Claims, 4 Drawing Figs.

[52] U.S. Cl. .................................................. 280/87
 74/493, 287/98
[51] Int. Cl. .................................................. B62d 1/18
[50] Field of Search .......................................... 280/87,
 87(.3); 180/78; 74/492, 493; 287/98

[56] References Cited
UNITED STATES PATENTS

| 743,013 | 11/1903 | Mott | 74/493(X) |
|---|---|---|---|
| 1,743,241 | 1/1930 | Schmidt | 287/98(X) |
| 2,088,146 | 7/1937 | Walker | 74/492 |
| 2,127,171 | 8/1938 | Hawthorn | 74/493 |
| 2,743,957 | 5/1956 | Sherman | 287/98 |
| 3,198,030 | 8/1965 | Miller et al. | 74/493 |

*Primary Examiner*—Leo Friaglia
*Assistant Examiner*—Leslie J. Paperner
*Attorney*—Noel G. Artman ABSTRACT: A steering assembly for a riding lawn mower of the type having a body defining an operator's compartment, and including a lower steering shaft journaled for rotation about a fixed axis, and an upper steering shaft hingedly joined to said lower shaft. A sliding collar normally fits around the junction of the two shafts locking the shafts in axial alignment. The collar is movable to a position removed from the junction whereby the upper shaft is swingable to a collapsed position in the operator's compartment.

PATENTED JAN 19 1971

INVENTORS
GORDON L. HERSHMAN
GERALD N. BORCHARDT

BY *Robert L. Graham*

ATT'Y

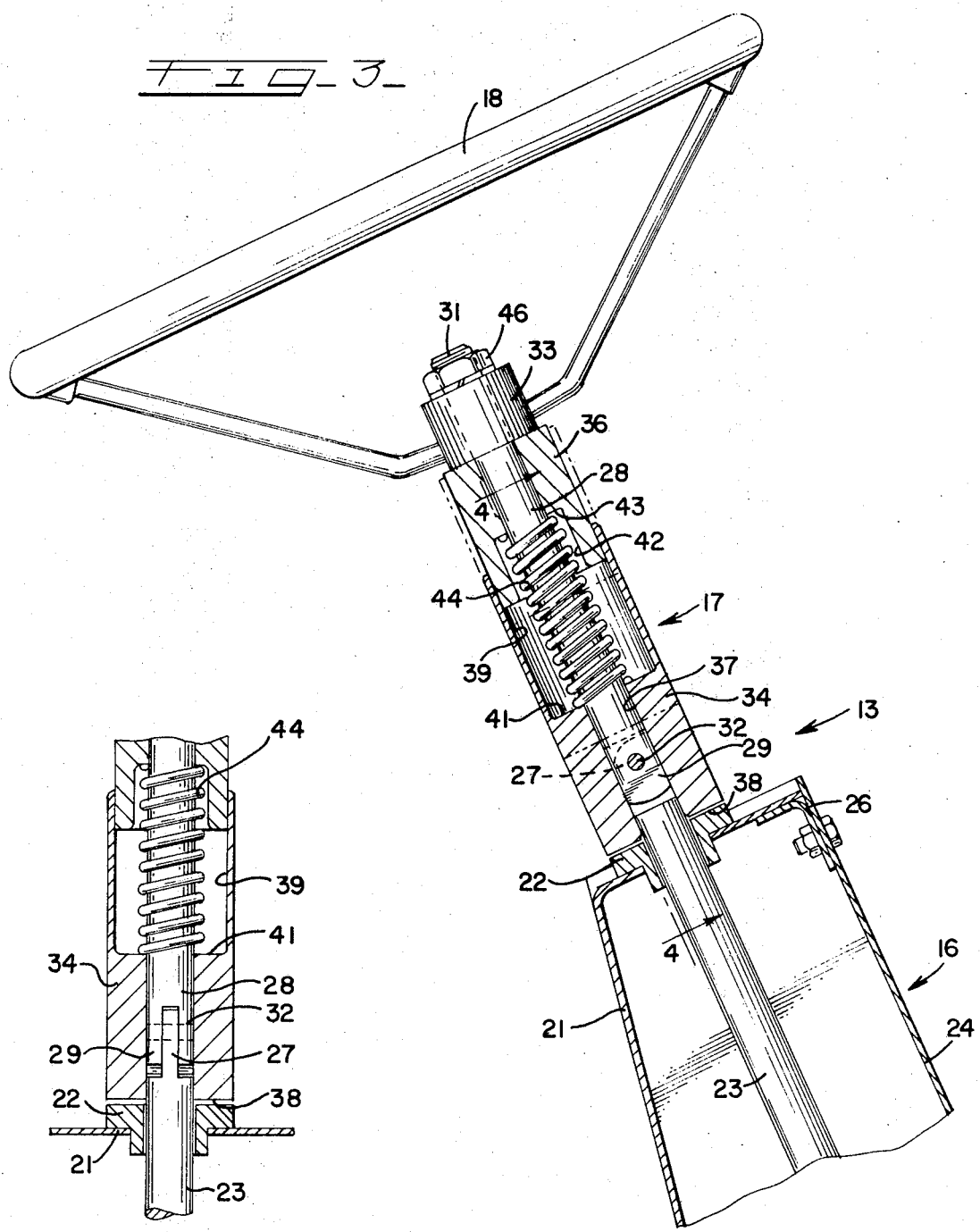

STEERING WHEEL PIVOTING MECHANISM FOR RIDING MOWER

BACKGROUND OF THE INVENTION

This invention relates generally to riding lawn mowers and more particularly to steering assemblies for such lawn mowers.

Riding lawn mowers designed specifically for residential use are generally compact maneuverable vehicles. Notwithstanding the compact character of the mower, transportability of the mower in enclosed vehicles such as station wagons is difficult because the overall height of the mower is generally greater than that of the cargo door opening. The steering wheel is positioned relative to the operator's compartment for convenience of the operator and therefore projects substantially above the mower body. While the overall mower height may be reduced by disassembling the steering assembly, this solution of the transportability problem is impractical since it requires tools and a certain amount of mechanical skill.

The general purpose of the present invention is to provide a riding lawn mower with a steering wheel collapsible into the operator's compartment thereby reducing the mower height. The reduction in mower height improves not only the mower transportability but also the mower storability. With its steering column in the collapsed position, the mower readily fits under work benches, tables, and the like.

Because of the compact character of the typical riding lawn mower, access to the operator's compartment for persons of large physical stature is difficult. An added feature of the present invention is the provision of a steering assembly which enables the steering wheel to be moved away from the operator's compartment and thereby improve accessibility.

SUMMARY

A steering assembly constructed according to this invention includes upper and lower steering shafts having adjacent ends pivotally connected. A spring-loaded locking collar maintains the adjacent end portions in axial alignment with the assembly in the operating position. The locking collar is movable axially away from the pivotal connection to permit angular movement of the upper shaft which supports the steering wheel to a collapsed position within the confines of the operator's compartment. In the collapsed position, the steering wheel is swingable laterally away from the operator's compartment thereby improving accessibility to the machine.

The objects of this invention may be summarized as follows:

To improve transportability and storability of the residential type riding lawn mower; and To improve accessibility to the operator's compartment.

DRAWINGS

FIG. 3 is an enlarged sectional view of a portion of the steering assembly shown in FIGS. 1 and 2; and FIG. 4 is a fragmentary sectional view of a portion of the steering assembly shown in FIG. 3 and taken generally along line 4—4 thereof.

DESCRIPTION OF THE PREFERRED EMBODIMENT

Figure 2:
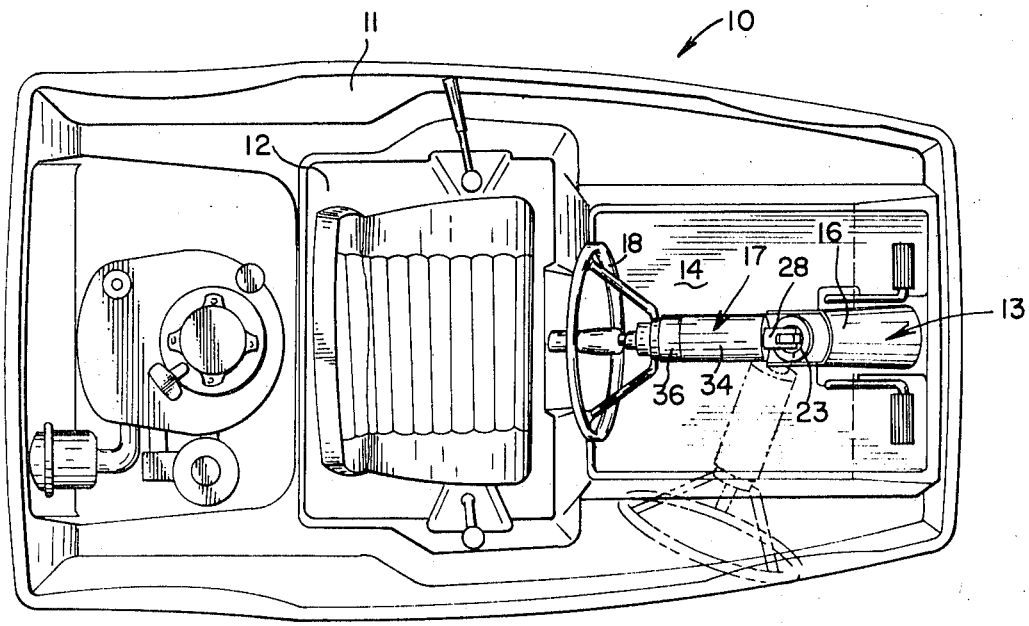
FIG. 2 is a plan view of the riding lawn mower illustrated in FIG. 1.
Figure 1:
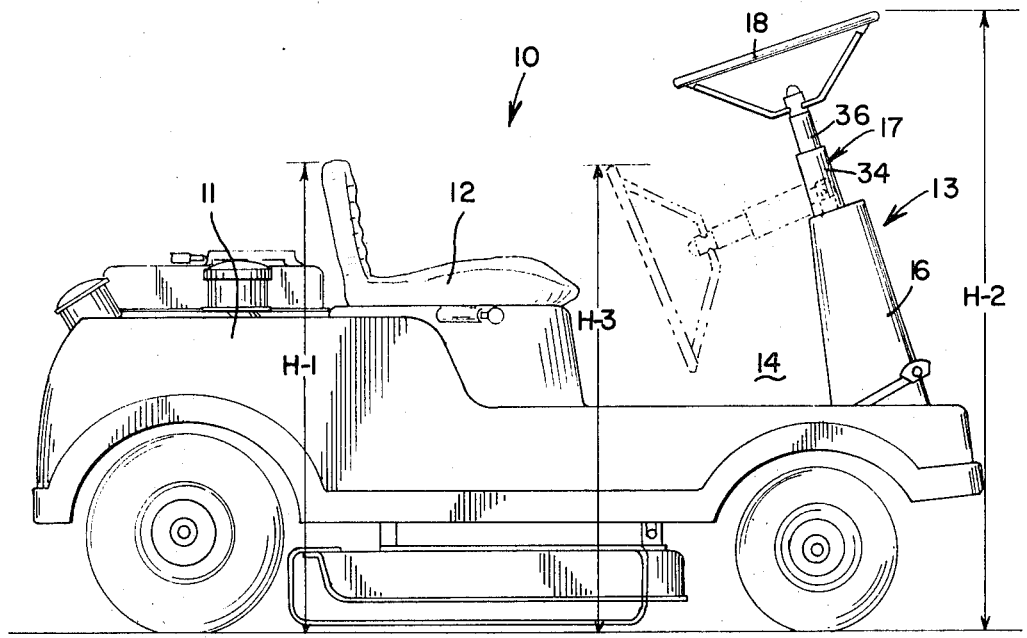
FIG. 1 is a side elevational view of a riding lawn mower provided with the novel steering assembly of this invention.

With reference to FIGS. 1 and 2 a self-propelled riding lawn mower 10 is seen to include a frame-supported body 11 on which is mounted a seat 12 and a steering assembly 13. The space between the seat 12 and the steering assembly 13 constitutes the operator's compartment which is designated by the numeral 14.

The steering assembly 13 includes a lower stationary support portion 16 and an upper movable portion 17 the upper end of which carries a steering wheel 18. In accordance with the objects of this invention, the upper portion 17 is angularly movable to a collapsed position (broken line position of FIG. 1) within the confines of the operator's compartment 14, thereby reducing the overall height of the mower from that indicated by the letter H–2 to that indicated by the letter H–3 which is slightly below the seat height denoted H–1.

As shown in FIGS. 3 and 4 the lower support portion 16 of the steering assembly 13 includes a support member 21 on which is mounted a bearing 22. The bearing 22 journally supports a lower steering shaft 23 which is operatively connected to the front wheels of the lawn mower 10 by conventional steering linkages. A shroud 24 encloses the lower steering shaft and assembly and is connected to the support member by brace 26 which adds rigidity to the structure. The lower steering shaft 23 projects above the bearing 22 and has formed therein a radially extending tang 27.

The upper portion 17 includes an upper steering shaft 28 having a lower bifurcated end 29 and an upper threaded end 31. The slot between the forks of the bifurcated end 29 receives the tang 27 and is hingedly connected thereto by means of a pin 32. The lower end of the forks are rounded as shown in FIG. 3 to permit pivotal movement of the upper shaft 28, about pin 32, relative to the lower shaft 23.

The steering wheel 18 includes a hub 33 mounted on the upper end 31 of the upper shaft 28. A pair of cooperably arranged collars 34 and 36 are mounted on the upper shaft 28 and provide the means for locking the upper and lower shafts 28 and 23 in axial alignment. The lower collar 34 has formed therein an axial opening 37 which closely conforms to the diameter of the shafts 23 and 28. The lower end of the lower sliding collar 34 has formed therein an annular surface 38 normally engageable with the bearing 22. An upwardly facing cylindrical recess 39 is formed in the collar 34 and is bottomed by annular surface 41. The recess 39 has an inside diameter conforming to the outside diameter of the collar 36 whereby the latter fits snugly in the former. The upper stationary collar 36 is secured to the hub 33 and has a lower portion disposed in recess 39. The bottom annular surface 43 of recess 42 confronts the annular surface 41 and is axially spaced therefrom. A compression spring 44 concentrically located around shaft 28 and having its opposite ends abutting surfaces 41 and 43 urges the sliding collar 34 downwardly into abutting relation with bearing 22. The column thus described is maintained in assembled relation by a nut 46 threadedly connected to the upper end 31 of the shaft 28.

Thus it will be appreciated that in the normal position the collar 34 and axial opening 37 encases the junction of the upper shaft 28 and the lower shaft 23 preventing pivotal movement of the former with respect to the latter. The lower collar 34 is axially movable upwardly along the upper shaft 28, the upper collar 36 being received in the recess 39. Movement of the collar 34 to the broken line position of FIG. 3 clears the opening 37 past the junction of shafts 23 and 28 whereby the upper steering portion 17 may be pivotally movable about the pin connection 32 to a collapsed position within the operator's compartment 14 (broken line position of FIG. 1). In this position the upper steering portion 17 is supported by the bearing 22. Note that the overall height of the machine 10 has been reduced from the dimension indicated by the letter H–2 to the dimension indicated by the letter H–1. This reduction is sufficient to permit the machine 10 to be loaded into a conventional enclosed vehicle such as a station wagon, or stored under a work bench or other confining area.

In the collapsed position of the upper portion 17, the steering wheel 18 is swingable to a position laterally removed from the operator's compartment 14 thereby improving the accessibility to the mower 10 (see FIG. 2). In this movement the upper portion 17 acts as a pivot arm rotating lower shaft 23 about its axis within the confines of the bearing 22. The broken line position of portion 17 shown in FIG. 2 illustrates the lateral extend to which the portion 17 may be removed from the compartment 14. As is evident from the illustration the accessibility of the operator's compartment 14 is greatly improved.

The operation of the steering assembly will be summarized with reference to FIGS. 1 and 2. Assuming that the vehicle has been transported or has been removed from storage with the upper portion 17 in the broken line position of FIG. 1, the operator first swings the steering wheel 18 to the position removed from the operator's compartment 14 and mounts the seat 12. Once situated in compartment 14, the operator returns the upper portion 17 to the solid line position of FIG. 2 while raising it to the erect position (solid line position of FIG. 1). When the shafts 23 and 28 are axially aligned, the spring loaded lower collar 34 snaps into place constraining the junction of shafts 23 and 28 from angular movement and thereby locking them in axial alignment. The steering assembly 13 is then ready for operation. If the operator wishes to return the steering assembly 13 to the storage or transport position the operation is reversed; that is, the collar 34 is manually moved upwardly until the lower end 38 clears the bifurcated end 29 of shaft 28 and the upper portion 17 is swung to the collapsed position within the confines of compartment 14. Note that this operation can be done while on or off the mower 10 and that no tools or particular skill is required.

Thus it has been demonstrated that the steering assembly constructed according to this invention provides for improved storability, transportability and accessibility.

We claim:

1. A steering assembly for a riding lawn mower of the type selectively positionable between a substantially upright locked operating position and a storage position remote from said locked position, said assembly comprising: a support; a lower steering shaft journaled to said support; an upper steering shaft; a steering handle mounted on said upper steering shaft; a hinged connection joining adjacent ends of said upper and lower shafts; a first collar slidably mounted on one of said shafts, said first collar having a concavity defining a peripheral wall structure thereabout; a second collar mounted on the other of said shafts and telescopically displaceable within the concavity of said first collar in a supporting close proximity to said peripheral wall structure; and said first and second collars having an extended position whereat one of said collars is positioned about said hinged connection to effect a locking of said shafts in axial alignment with each other, said collars having a retracted position at which said second collar telescopes into the concavity of said first collar providing a displacement of that collar locking said shafts to effect a release thereof, whereat said second collar provides an underlying support of the peripheral wall structure along the telescoped portion of said first collar when the steering assembly is in the remote storage position.

2. The invention as recited in claim 1 wherein said first collar is mounted on said shafts and disposed about said hinged connection to effect the locking thereof in the extended position, said first collar being movable axially upwardly along said upper shaft to said retracted position.

3. The invention as recited in claim 2 and further comprising bias means for urging said first and second collars into said extended locking position, said first collar being movable to said retracted position against the force of said bias means whereby said upper shaft may be angularly moved relative to said lower shaft, said bias means being operative to snap said first collar to said extended locking position attendant to said upper shaft being moved from an angular to an axially aligned position relative to said lower shaft.

4. The invention as recited in claim 3 wherein said bias means includes a compression spring concentrically mounted on said upper shaft within said concavity and having its opposite ends in engagement with said first and second collars.

5. In a riding lawn mower of the type having a mounted body defining an operator's compartment, a steering assembly comprising: a support mounted at the forward end of said body and in advance of said operator's compartment; a lower shaft journaled to said support and having an upper end projecting above said support; an upper steering shaft having a lower end hingedly connected to said upper end of said lower shaft; a steering wheel mounted on said upper shaft; a lower collar slidably mounted on said upper and lower shafts about the hinge connected thereat to effect an axially aligned interconnection of said upper and lower shafts in a substantially upright operating position, said lower collar having an upwardly facing concavity defining a peripheral wall structure thereabout; and an upper collar mounted on said upper shaft and telescopically displaceable within said concavity to provide an underlying support for said peripheral wall structure when said lower collar is moved upwardly to a position whereat said upper shaft and said steering wheel are swingable about said hinged connection to a collapsed position in said operator's compartment.